United States Patent [19]

Mahabadi et al.

[11] Patent Number: 5,575,954
[45] Date of Patent: *Nov. 19, 1996

[54] PROCESS FOR PREPARING CONDUCTIVE POLYMERIC PARTICLES WITH LINEAR AND CROSSLINKED PORTIONS

[75] Inventors: Hadi K. Mahabadi, Toronto; Denise Y. Wright, Calgary; Michael F. Cunningham, Georgetown, all of Canada; John A. Creatura, Ontario, N.Y.

[73] Assignee: Xerox Corporation, Stamford, Conn.

[*] Notice: The term of this patent shall not extend beyond the expiration date of Pat. No. 5,487,847.

[21] Appl. No.: 546,627

[22] Filed: Oct. 23, 1995

Related U.S. Application Data

[63] Continuation of Ser. No. 225,855, Apr. 11, 1994, Pat. No. 5,487,847.

[51] Int. Cl.$^6$ .............................. G03G 5/00; G03G 9/10; C08F 2/14; C08F 2/32
[52] U.S. Cl. .......................... 252/511; 252/506; 252/510; 252/518; 252/521; 252/500; 252/520; 252/513; 252/519; 252/503; 252/509; 252/512; 430/137
[58] Field of Search ..................... 252/511, 502, 252/506, 510, 518, 521, 500, 520, 513, 519, 503, 509, 512; 430/137, 138, 108, 109, 111; 428/407; 526/201, 89, 908

[56] References Cited

U.S. PATENT DOCUMENTS

| | | | |
|---|---|---|---|
| 4,299,903 | 11/1981 | AuClair et al. | 430/109 X |
| 4,727,011 | 2/1988 | Mahabadi et al. | 430/138 |
| 5,045,611 | 9/1991 | McNeil | 526/81 |
| 5,114,824 | 5/1992 | Tan et al. | 430/137 |
| 5,153,092 | 10/1992 | Kao et al. | 430/137 |
| 5,215,847 | 6/1993 | Patel et al. | 430/137 X |
| 5,229,242 | 7/1993 | Mahabadi et al. | 430/110 X |
| 5,322,912 | 6/1994 | Georges et al. | 526/204 |
| 5,334,479 | 8/1994 | Chen | 430/137 |
| 5,342,724 | 8/1994 | Wilson | 430/109 X |
| 5,487,847 | 1/1996 | Mahabadi et al. | 252/511 |
| 5,529,719 | 6/1996 | Cunningham et al. | 252/511 |

*Primary Examiner*—Douglas J. McGinty
*Attorney, Agent, or Firm*—E. O. Palazzo

[57] ABSTRACT

A process for the preparation of conductive polymeric particles with linear and crosslinked portions, which comprises mixing a monomer with at least one conductive filler, solvent, at least one polymerization initiator, and a chain transfer component; effecting solution polymerization by heating until from about 80 to about 100 weight percent of the monomer has been polymerized; drying the mixture by removing the solvent to yield an intimate blend of polymer with conductive filler; dispersing the aforementioned blend of polymer and conductive filler in at least one monomer with at least one polymerization initiator, a crosslinking agent and a chain transfer agent to form an organic phase; dispersing the resulting organic phase mixture in water containing a stabilizing component to obtain a suspension of particles with an average volume diameter of from about 0.05 to about 5 microns in water; polymerizing the resulting suspension by heating; and subsequently optionally washing and drying the polymeric product.

33 Claims, No Drawings

5,575,954

PROCESS FOR PREPARING CONDUCTIVE POLYMERIC PARTICLES WITH LINEAR AND CROSSLINKED PORTIONS

This is a continuation, of application Ser. No. 225,855, filed Apr. 11, 1994, now U.S. Pat. No. 5,487,847.

BACKGROUND OF THE INVENTION

This invention is generally directed to conductive composite particles and processes for the preparation thereof, and more specifically the present invention relates to small conductive polymeric composite particles, each comprising a polymer and a conductive filler distributed, preferably evenly throughout the polymer matrix of composite. The present invention also relates to processes for the preparation of polymeric composite particles. In one embodiment, the process of the present invention comprises the preparation of conductive polymeric particles containing a conductive filler distributed substantially throughout the polymer matrix of the particles, and which particles can be selected as carrier powder coatings. In another embodiment, the process of the present invention comprises the preparation of conductive polymeric composite particles with an average volume particle size diameter of from between about 0.05 micron to about 5 microns. The conductivity of the generated submicron polymeric composite particles can be modified by, for example, varying the weight percent of conductive filler component present in effective amounts of, for example, from between about 1 weight percent to about 50 weight percent, and also by varying the composition of the conductive filler component. Thus, in embodiments conductive submicron polymeric composite particles with a conductivity of from between about $10^{-10}$ (ohm-cm)$^{-1}$ to about $10^{-1}$ (ohm-cm)$^{-1}$ can be prepared. In embodiments, the particles with average diameter of about 0.05 to about 5 microns conductive composite particles are comprised of polymer and a conductive filler distributed evenly throughout the polymer matrix of the composite product, and which product can be obtained by a modified semisuspension polymerization method in which at least one monomer is mixed with a conductive filler, solvent, one or more polymerization initiators, and a chain transfer component; effecting solution polymerization by heating until from about 80 to about 100 weight percent of the monomer has been polymerized; drying the mixture by removing the solvent; dispersing the aforementioned mixture of conductive filler or fillers and polymer in at least one monomer with one or more polymerization initiators, a crosslinking agent and a chain transfer agent; dispersing the resulting mixture in water containing a stabilizing component to obtain a suspension of particles with an average diameter of from about 0.05 to about 5 microns in water; polymerizing the resulting suspension by heating; and subsequently optionally the product is washed and dried.

Metals such as carrier cores are conductive or semiconductive materials, and the polymeric materials used to coat the surface of metals are usually insulating. Therefore, carrier particles coated completely with polymer or a mixture of polymers can lose their conductivity and become insulating. Although this is desired for some applications, for conductive magnetic brush systems (CMB) the carrier particles should be conductive. Since the carrier polymer coating can be utilized to control carrier tribo, a conductive carrier coating is needed to design carriers with the desired conductivity and triboelectrical properties. Conductive polymers are very costly, and are not suitable for preparing low cost, for example less than $5/pound, coating, thus a conductive polymer composite comprising a low cost polymer and a conductive filler, such as conductive carbon black, is considered a more suitable alternative.

A polymer composite coating of metal materials, such as carrier beads, is known and can generally be obtained by two general approaches, solution and powder coating. Solution coating of carriers with a polymer composite solution comprised of a polymer, a conductive filler and solvent can be utilized to prepare conductive carrier, however, trapping of solvent in the solution coating can adversely interfere with the use of coated materials, for example the residual solvent trapped in the carrier coating reduces the carrier life, and the release of solvent in the developer housing can cause other problems related to the harmful effects of absorbed solvent to various copying machine parts and the toxicity of solvent. Moreover, the solvent recovery operation involved in the solution coating processes is costly. The powder coating of metal surfaces can eliminate the need for solvent, and therefore, many of the problems associated with solution coating; however, it requires a polymer powder with a very small size, for example less than 1 to 5 microns. Although polymer powders are available for carrier powder coating, submicron or micron-sized polymer composite particles containing conductive filler to prepare conductive coated carriers that maintain their triboelectrical characteristics for extended time periods exceeding, for example, 200,000 images and which possess the other advantages illustrated herein are desired.

Semisuspension polymerization process is known, reference U.S. Pat. No. 5,236,629, the disclosure of which is totally incorporated herein by reference. The '629 patent describes a process for the preparation of conductive submicron polymeric particles which comprises mixing at least one monomer with a polymerization initiator, a crosslinking component and a chain transfer component; effecting bulk polymerization until from about 10 to about 50 weight percent of the monomer has been polymerized; terminating polymerization by cooling the partially polymerized monomer; adding thereto from about 1 to about 50 weight percent of a conductive filler, or conductive fillers, followed by mixing thereof; dispersing the aforementioned mixture of conductive filler or fillers, and partially polymerized product in water containing a stabilizing component to obtain a suspension of particles with an average diameter of from about 0.05 to about 1 micron in water; polymerizing the resulting suspension by heating; and subsequently washing and drying the product. There are some disadvantages with the '629 process which can be overcome by the modified semisuspension polymerization process of the present invention. For example, although most carbon blacks, which are known to be free radical inhibitors, can be used in the '629 process, those carbon blacks which are very strong inhibitors, for example some highly oxidized carbon blacks, can inhibit the polymerization of the '629 process. In the modified semisuspension polymerization process of the present invention it is possible to select very strongly inhibiting carbon blacks. Furthermore, the nature of the conductive filler dispersion in the '629 process is one of free filler particles physically dispersed in the polymer matrix, while in the modified semisuspension polymerization process of the present invention the filler, such as carbon black, contains the polymer made in the solution polymerization step chemically grafted or strongly adsorbed onto its surface thereby enhancing its dispersion stability. Therefore, with the present invention there are fewer problems associated with free filler particles that can occur in the '629 process if the bulk polymerization step is not conducted to the optimum conversion. The modified semisuspension polymerization process of the present invention also provides advantages in obtaining a more uniform dispersion of filler in the final particles primarily because of the grafted or adsorbed polymer on the filler surface. While some additives are difficult to disperse in various monomers, depending on the surface compatibility of the filler and monomers, the modified semisuspension polymerization process overcomes this difficulty by chemically grafting or adsorbing polymer on the filler surface during the solution polymerization. This solution polymerization step, therefore, compatibilizes the filler with the monomer, thereby ensuring better filler dispersion than in the '629 process. This results in fewer final particles without filler, which is particularly important for conductive particles, as there can be a significant decrease in conductivity when even a small fraction of nonconductive particles, that is particles without filler, are mixed in with the conductive particles.

The preparation of polymeric particles for powder coatings can be accomplished, for example, by three methods, namely grinding or attrition, precipitation and in situ particle polymerization. Grinding or attrition, especially fluid energy milling, of large polymeric particles or polymeric composite particles containing fillers to the size needed for powder coating, for example less than 1 to 5 microns, is often not desirable both from an economic and functional viewpoint. These materials are difficult to grind and, therefore, grinding or attrition of required materials for coating with present milling equipment is very costly due to very low processing yield, for example in the range of 5 to 10 weight percent. Precipitation process can also be used to prepare polymeric/polymeric composite particles. In one process, the polymer solution is heated to above its melting temperature and then cooled to form particles. In another process, the polymer solution is precipitated using a nonsolvent or the polymer solution is spray dried to obtain polymeric/polymeric composite particles. With all these precipitation processes, it has been difficult to achieve low cost, pure polymer, that is, for example, with no or substantially no impurities such as solvents or precipitants in the resulting polymer particles. It is also difficult to obtain particles with small particle size and narrow particle size distribution. It is also difficult to control filler distribution throughout each particle's polymer matrix. In the in situ particle polymerization process, polymer particles are prepared by using suspension dispersion, emulsion and semisuspension polymerization. Suspension polymerization can be utilized to prepare polymer particles and polymeric composite particles containing, for example, a conductive filler. However, this process does not, for example, effectively enable particles with a size of less than 5 microns. Although emulsion and dispersion polymerization can be utilized to prepare polymeric particles of a small size, for example less than 5 microns, these processes wherein particle formation is achieved by nucleation and growth do not, it is believed, enable synthesis of particles containing fillers such as conductive fillers.

There is disclosed in U.S. Pat. No. 4,908,665 a developing roller or developer carrier comprised of a core shaft, a rubber layer and a resin coating layer on the surface of the rubber containing conductive fillers for a one component developer. It is indicated in the '665 patent that a conductive developing roller can eliminate variation of the image characteristic due to the absorption of moisture for one component development. This patent thus describes a developing roller for one component developer. U.S. Pat. No. 4,590,141 discloses carrier particles for two component developer coated with a layer of silicon polymer using fluidized bed solution coating. U.S. Pat. No. 4,562,136 discloses a two component dry type developer of carrier particles coated with a silicon resin containing a monoazo metal complex charging. The two component carriers described in the above two patents are insulating and are not believed to be conductive. There is disclosed in U.S. Pat. No. 4,912,005 a conductive carrier composition coated with a layer of resin containing a conductive particle by solution coating. Residual solvent trapped in the aforementioned coated layer adversely effects the maintainability of carrier electrical properties for an extended time period.

There is disclosed in U.S. Pat. No. 3,505,434 a process wherein particles for fluidized bed powder coating are prepared by dispersing the polymer in a liquid which is heated to above the polymer melting point and stirred causing the polymer particles to form. The particles are then cooled below their melting point and recovered. However, this process does not, for example, enable particles with a size of below 50 microns in average volume diameter.

Also, the suspension polymerization of monomer is known for the formation of polymer/polymeric composite particles generally in a size range of about 200 microns and higher. The main advantage of suspension polymerization is that the product may easily be recovered, therefore, such a process is considered economical. However, it is very difficult by suspension polymerization to prepare very small particles as the monomer droplets tend to coalesce during the polymerization process, especially in the initial stage of polymerization where the droplets are very sticky. For example, there is disclosed in U.S. Pat. No. 3,243,419 a method of suspension polymerization wherein a suspending agent is generated during the suspension polymerization to aid in the coalescence of the particles. Also disclosed in U.S. Pat. No. 4,071,670 is a method of suspension polymerization wherein the monomer initiator mixture is dispersed in water containing stabilizer by a high shear homogenizer, followed by polymerization of suspended monomer droplets.

Further, disclosed in U.S. Pat. No. 4,835,084 is a method for preparing pigmented particles wherein high concentration of silica powder is used in the aqueous phase to prevent coalescence of the particles. There is also disclosed in U.S. Pat. No. 4,833,060 a process for the preparation of pigmented particles by dissolving polymer in monomer and dispersing in the aqueous phase containing silica powder to prevent coalescence of the particles. However, the silica powder used in both U.S. Pat. Nos. –084 and –060 should be removed using KOH which is costly, and residual KOH and silica materials remaining on the surface adversely affects the charging properties of particles. There is also disclosed in U.S. Pat. No. 3,954,898 a two step polymerization process for the preparation of a thermosetting finished powder. However, this process does not enable synthesis of particles with a size less than about 100 microns. Moreover, this patent does not teach the synthesis of submicron particles containing conductive fillers.

As a result of a patentability search for U.S. Pat. No. 5,043,404 (D/89032), there were located U.S. Pat. No. 4,486,559, which discloses the incorporation of a prepolymer into a monomer toner mix followed by emulsion polymerization; and 4,680,200 and 4,702,988, which illustrate emulsion polymerization. It is known that submicron polymeric particles can be synthesized by emulsion polymerization. However, synthesis of submicron polymeric particles by emulsion polymerization requires a high concentration of emulsifier which remains in the final product and renders it humidity sensitive. Therefore, emulsion polymerization does not enable preparation of clean submicron polymeric particles which are not sensitive to humidity. Moreover, in the emulsion polymerization particle formation is controlled by diffusion of monomer from monomer droplet through a water phase into the growing particles. This mechanism, which is characteristic of emulsion polymerization, does not allow inclusion of conductive fillers in the polymeric particles. Furthermore, it is known that the addition of conductive fillers into emulsion, dispersion or suspension polymerization systems causes severe inhibition which stops or reduces the rate of polymerization significantly.

Disclosed in the aforementioned U.S. Pat. No. 5,043,404 (D/89032), the disclosure of which is totally incorporated herein by reference, is a semisuspension polymerization process for the preparation of small polymeric particles which are comprised of a mixture of monomer or comonomers, a polymerization initiator, a crosslinking component and a chain transfer component which are bulk polymerized until partial polymerization is accomplished. The resulting partially polymerized monomer or comonomers is dispersed in water containing a stabilizer component with, for example, a high shear mixer, then the resulting suspension polymerized, followed by washing and drying the submicron polymeric particles. U.S. Pat. No. 5,236,629 discloses a process for the preparation of conductive submicron polymeric particles which comprises mixing at least one monomer with a polymerization initiator, a crosslinking component and a chain transfer component; effecting bulk polymerization until from about 10 to about 50 weight percent of the monomer has been polymerized; terminating polymerization by cooling the partially polymerized monomer; adding thereto from about 1 to about 50 weight percent of a conductive filler, or conductive fillers, followed by mixing thereof; dispersing the aforementioned mixture of conductive filler or fillers, and partially polymerized product in water containing a stabilizing component to obtain a suspension of particles with an average diameter of from about 0.05 to about 1 micron in water; polymerizing the resulting suspension by heating; and subsequently washing and drying the product.

The modified semisuspension polymerization process described in the present application offers a different process with significant improvements over the process disclosed in U.S. Pat. No. 5,236,629. These advantages include (1) superior uniformity of the conductive filler in the final particles because of the solution polymerization step in which polymer is grafted or adsorbed onto the surface of the filler; (2) fewer particles containing no conductive filler due to improved dispersion; (3) higher conductivity in the final particles at the same weight percent loading of conductive filler because of the better filler dispersion; (4) fewer potential problems with free conductive filler particles contaminating the final product and causing, for example, problems with contamination in the developer housing when the particles are coated on carrier cores; and (5) the ability to use fillers which are very strong free radical polymerization inhibitors such as some highly oxidized carbon blacks. With the present invention, a process to obtain conductive submicron or micron-sized polymer particles of less than about 1 to about 5 microns in average volume diameter as determined by a scanning electron microscope, each containing conductive fillers evenly dispersed in the polymer. These polymeric particles contain from about 1 to about 50 weight percent of a conductive filler, such as carbon black, which is evenly distributed throughout the polymer matrix. This modified semisuspension polymerization process permits the preparation of low cost, clean, and dry submicron conductive polymeric particles that can be selected as carrier powder coatings.

SUMMARY OF THE INVENTION

It is, therefore, an object of this invention to provide conductive small polymeric composite particles and processes thereof with many of the advantages illustrated herein.

In another object of the present invention there are provided small conductive submicron polymeric composites comprised of a polymer and a conductive filler distributed evenly and in embodiments uniformly throughout the polymer matrix of the composite and process for the preparation thereof.

In yet another object of the present invention there are provided low cost, clean and dry conductive small polymeric composite particles comprised of from about 50 to about 99 weight percent of polymer and from about 1 to about 50 weight percent of conductive filler distributed throughout the polymer matrix of the composite as measured by TEM, and processes for the preparation thereof.

Another object of the present invention resides in conductive submicron polymeric composite particles with a conductivity from about $10^{-10}$ (ohm-cm)$^{-1}$ to about $10^{-1}$ (ohm-cm)$^{-1}$ and processes for the preparation thereof.

Another object of the present invention resides in conductive submicron polymeric composite particles with an average particle diameter size of from about 0.05 micron to about 5 microns.

In another object of the present invention there are provided conductive small polymeric composites which can be selected for two component carrier powder coatings, reference U.S. Pat. Nos. 4,937,166 and 4,935,326, the disclosures of which are totally incorporated herein by reference, and processes for preparing such carriers; and wherein improved dispersion of conductive fillers can be achieved in submicron conductive carrier coating polymeric composite particles.

In another object of the present invention there are provided simple processes for the formation of small conductive polymeric particles, and more specifically from about 1 to about 5 micron size (average volume throughout) conductive polymeric particles.

Also, in another object of the present invention there are provided simple and economical processes for the formation of conductive submicron polymeric particles that can be selected as carrier coatings, reference U.S. Pat. Nos. 4,937,166 and 4,935,326, the disclosures of which are totally incorporated herein by reference.

Another object of the present invention resides in simple and economical semisuspension polymerization processes for the preparation of low cost, clean, and dry small conductive polymeric particles, and more specifically submicron or micron-size conductive polymeric particles useful as carrier powder coatings.

Additionally, in another object of the present invention there are provided as a result of the enhanced degree of control and flexibility processes for the preparation of polymeric particles containing a conductive filler, or fillers with improved flow and fusing properties; and particles that can be selected for conductive carrier powder coating with a triboelectric charge in the range, for example, of from about −40 to about +40 microcoulombs per gram as determined by the known Faraday Cage process.

These and other objects of the present invention can be accomplished in embodiments by the provision of processes for the preparation of small conductive polymer particles, each containing a conductive filler or fillers distributed evenly throughout the polymer matrix of particles, referred to herein as modified semisuspension polymerization processes in which at least one monomer is mixed with a carbon black, or a metal oxide like tin oxide, a solvent, one or more polymerization initiators, and a chain transfer component; effecting solution polymerization by heating until from about 80 to about 100 weight percent of the monomer has been polymerized; drying the mixture by removing the solvent to yield a blend of polymer and conductive filler that contains from about 10 percent to about 80 percent filler; and dispersing the aforementioned mixture of conductive filler or fillers and polymer in at least one monomer with one or more polymerization initiators, a crosslinking agent and a chain transfer agent. The viscosity of the organic phase can in embodiments be an important factor in controlling dispersion of the conductive filler in the particles, and which viscosity can be adjusted by the percentage of polymer in the mixture. Typical viscosities are in the range of from about 10 centipoises to 100,000 centipoises. The aforementioned mixture is then dispersed in water containing a stabilizing component with, for example, a high shear mixer to permit the formation of a suspension containing small, less than about 10 microns, and more specifically from about submicron to about 5 microns, for example, particles therein, and thereafter, transferring the resulting suspension product to a reactor, followed by polymerization until complete conversion to the polymer product is achieved. The polymer product can then be cooled, washed and dried. More specifically, the process of the present invention is comprised of (1) mixing a monomer or comonomers with one or more conductive fillers, solvent, polymerization initiators, and a chain transfer component; (2) effecting solution polymerization by increasing the temperature of the aforementioned mixture to from about 45° C. to about 120° C. until from about 80 to about 100 weight percent of monomer or comonomers has been polymerized; (3) drying this mixture by removing the solvent to yield an intimate blend of polymer and conductive filler; (4) dispersing this blend of polymer and conductive filler in monomer or comonomers with at least one polymerization initiator, a crosslinking component and a chain transfer component to provide an organic phase; the molecular weight and concentration of polymer in this organic phase affects the viscosity of the organic phase which is an important factor in controlling the conductive filler distribution in the particles; (5) dispersing the organic phase in from about 2 to about 5 times its volume of water containing from about 1 to about 5 weight percent of a stabilizing component to form a suspension with a particle size diameter of from about 0.05 micron to about 5 micron particles containing from about 1 to about 50 weight percent of a conductive filler, or conductive fillers using a high shear mixer; (6) transferring the resulting suspension to a reactor and polymerizing the suspension by increasing its temperature to from about 45° C. to about 120° C. to allow the complete conversion of monomer or comonomers to polymer; (7) cooling the product and washing the product with water and/or an alcohol like methanol; (8) separating polymer particles from the water/methanol by means of filtration or centrifugation; and (9) drying the polymeric particles.

The present invention is directed to the preparation of small conductive polymeric particles, that is with, for example, an average particle diameter in the range of from about 0.05 micron to about 5 microns, and preferably from about 0.1 to about 1.0 micron as measured by SEM containing 1 to about 50 percent and preferably 10 to 20 percent of conductive filler distributed throughout the polymer matrix of particles, and which polymer particles have a number and weight average molecular weight of from between about 3,000 to about 500,000 and from between about 5,000 to about 2,000,000, as determined by gel permeation chromatography, respectively, in embodiments.

Further, the process of the present invention is directed to the preparation of conductive polymeric particles of average diameter of from about 0.1 micron to about 1.0 micron containing 10 to 20 weight percent of a conductive filter and 80 to 90 weight percent of a polymeric material. This polymeric material can be comprised of linear and crosslinked portions with a number average molecular weight of the linear portion being from about 3,000 to about 50,000 and a weight average molecular weight of from about 100,000 to about 500,000 and from 0.1 to about 25 weight percent of a crosslinked portion, and which polymer product is useful for carrier coatings. More specifically, the process of the present invention in embodiments is directed to the preparation of conductive polymeric particles of an average diameter in the range of between about 0.1 to about 1.0 micron, conductive filler distributed evenly throughout the polymer matrix particle as measured by TEM with a linear portion having a number average molecular weight in the range of from about 3,000 to about 50,000, and a weight average molecular weight of from about 100,000 to about 500,000 and from about 0.1 to about 25 weight percent of a crosslinked portion. This process is as indicated herein and specifically comprises (1) mixing a monomer or comonomers with a conductive filler with the ratio of monomer or comonomers to conductive filler being from about 10/1 to about 1/10, a solvent with the ratio of monomer or comonomers to solvent being from about 20/1 to about 1/20, at least one polymerization initiator with the ratio of monomer or comonomers to initiator being from about 100/2 to about 100/20, and a chain transfer component with the ratio of monomer or comonomers to the chain transfer component being from about 100/0.01 to about 100/1; (2) effecting solution polymerization by increasing the temperature of the mixture to from about 45° C. to about 120° C. until from about 80 to about 100 weight percent of monomer or comonomers has been converted to polymer with a number average molecular weight of from about 3,000 to about 50,000 and a weight average molecular weight of from about 5,000 to about 40,000, (3) drying this mixture by removing solvent; (4) dispersing this polymer/filler blend in monomer or monomers with the ratio of polymer/filler blend to monomers being from about 5/100 to about 100/100 with at least one polymerization initiator with the ratio of monomer or comonomers to initiator being from about 100/2 to about 100/20, a crosslinking component with the ratio of monomer or comonomers to the crosslinking component being from about 100/0.01 to about 100/5, and a chain transfer component with the ratio of monomer or comonomers to the chain transfer component being from about 100/0.01 to about 100/1 to yield an organic phase; (5) dispersing the resulting organic phase from about 2 to about 5 times its volume in water containing from about 1 to about 5 weight percent of a stabilizing component, preferably polyvinylalcohol having a weight average molecular weight of from about 1,000 to about 10,000 to form a suspension containing particles with a particle size diameter of from 0.1 to about 1.0 micron by using high shear mixer; (4) transferring the resulting suspension to a reactor and polymerizing the suspension by increasing its temperature to from about 45° C. to about 120° C. to allow the complete conversion of monomer or comonomers to polymer; (5) washing the resulting product with equal volumes of methanol and/or water from about 3 to about 5 times; (6) separating polymeric particles from water/methanol by means of filtration or centrifugation; and (7) drying of the polymeric particles. Optionally, the drying step (3) above can be eliminated and the solvent can be removed by an appropriate technique after the monomers have been added as in step (4).

In embodiments, the present invention is directed to a process for the preparation of conductive small polymeric particles which comprises mixing at least one monomer with a carbon black, solvent, one or more polymerization initiators, and a chain transfer component; effecting solution polymerization by heating until from about 80 to about 100 weight percent of the monomer has been polymerized; drying the mixture by removing the solvent; dispersing the aforementioned mixture of conductive filler or fillers and polymer in at least one monomer with one or more polymerization initiators, a crosslinking agent and a chain transfer agent; dispersing this mixture in water containing a stabilizing component to obtain a suspension of particles with an average diameter of from about 0.05 to about 5 microns in water; polymerizing the resulting suspension by heating; and subsequently washing and drying the product.

Illustrative examples of monomer or comonomers present in an amount of, for example, from about 80 to about 99 weight percent, and more preferably from about 80 to about 90 weight percent include vinyl monomers comprised of styrene and its derivatives such as styrene, α-methylstyrene, p-chlorostyrene and the like; monocarboxylic acids and their derivatives such as acrylic acid, methyl acrylate, ethyl acrylate, butyl acrylate, dodecyl acrylate, octyl acrylate, phenyl acrylate, methacrylic acids, methyl methacrylate, ethyl methacrylate, butyl methacrylate, octyl methacrylate, acrylonitrile and acrylamide; dicarboxylic acids having a double bond and their derivatives such as maleic acid, monobutyl maleate, dibutylmaleate; vinyl esters such as vinyl chloride, vinyl acetate and vinyl benzoate; vinyl ketones such as vinyl methyl ketone and vinyl ether ketone; and vinyl ethyl ether and vinyl isobutyl ether; vinyl naphthalene; unsaturated mono-olefins such as isobutylene and the like; vinylidene halides such as vinylidene chloride and the like; N-vinyl compounds such as N-vinyl pyrrole and fluorinated monomers such as pentafluoro styrene, allyl pentafluorobenzene and the like; and mixtures thereof.

Illustrative examples of polymerization initiators present in an amount of, for example, from about 0.1 to about 20 weight percent of monomer, and more preferably from about 1 to about 5 weight percent include azo compounds such as 2,2'azodimethylvaleronitrile, 2,2'azoisobutyronitrile, azobiscyclohexanenitrile, 2-methylbutyronitrile and the like, and peroxide such as benzoyl peroxide, lauryl peroxide, 1-1-(t-butylperoxy)-3,3,5-trimethylcyclohexane, n-butyl-4,4-di-(t-butylperoxy)valerate, dicumyl peroxide and the like.

Crosslinkers selected for the process of the present invention are known and can be comprised of compounds having two or more polymerizable double bonds. Examples of such compounds include aromatic divinyl compounds such as divinylbenzene and divinylnaphthalene; carboxylic acid esters having two double bounds such as ethylene glycol diacrylate, ethylene glycol dimethylacrylate and the like; and divinyl compounds such as divinyl ether, divinyl sulfite, divinyl sulfone and the like. Among these, divinylbenzene is particularly useful. The crosslinking component is preferably present in an amount of from about 0.1 to about 5 parts by weight in 100 parts and, more preferably, from 0.2 to 1 part by weight of the monomer or comonomers.

Examples of conductive fillers present in effective amounts, for example, from about 1 to 50 weight percent and more preferably from 5 to 30 weight percent, and the like, and which amounts can in embodiments be based on (1) how much filler is needed for minimum effect on conductivity, and (2) achieving a conductivity plateau including conductive carbon blacks such as acetylene black, available from Chevron Chemical, VULCAN BLACK™, BLACK PEARL L®, KETJENBLACK EC600JD®, available from AKZO, CONDUCTEX SC ULTRA™, available from Columbian Chemical, metal oxides such as iron oxides, TiO, $SnO_2$, metal powders such as iron powder, and the like.

Stabilizers present in an amount of, for example, from about 0.1 to about 5 weight percent and, more preferably, from 1 to 4 weight percent of water are selected from the group consisting of both nonionic and ionic water soluble polymeric stabilizers such as methyl cellulose, ethyl cellulose, hydroxypropyl cellulose, block copolymer such as PLURONIC E87™ available from BASF, the sodium salt of carboxyl methyl cellulose, polyacrylate acids and their salts, polyvinyl alcohol, gelatins, starches, gums, alginates, zein, casein and the like; and barrier stabilizers such as tricalcium phosphate, talc, barium sulfate and the like. Polyvinyl alcohol with a weight average molecular weight of from about 1,000 to about 10,000 is particularly useful.

Chain transfer components selected, which primarily function to control molecular weight by inhibiting chain growth, include mercaptans such as laurylmercaptan, butylmercaptan and the like, or halogenated carbons such as carbon tetrachloride or carbon tetrabromide, and the like. The chain transfer agent is preferably present in an amount of from about 0.01 to about 1 weight percent and more preferably from 0.1 to 0.5 weight percent monomer or comonomers. Also, stabilizer present on the surface of the polymeric particles can be washed using an alcohol such as, for example, methanol and the like, or water. Separation of washed particles from solution can be achieved by any classical separation technique such as filtration, centrifugation and the like. Classical drying techniques such as vacuum drying, freeze drying, spray drying, fluid bed drying and the like can be selected for drying of the polymeric particles.

Illustrative specific examples of polymer or copolymers present in an amount of about 50 to about 99 weight percent, more preferably from 70 to 95 weight percent., and from about 5 to about 300 percent in embodiments containing, for example, both a linear and a crosslinked portion in which the ratio of crosslinked portion to linear portion is from about 0.001 to about 0.25 and the number and weight average molecular weight of the linear portion is from about 3000 to about 500,000 and from about 5,000 to about 2,000,000, respectively, include vinyl polymers of polystyrene and its copolymers, polymethylmethacrylate and its copolymers, unsaturated polymers or copolymers such as styrene-butadiene copolymers, fluorinated polymers or copolymers such as polypentafluorostyrene, polyallylpentafluorobenzene and the like.

The particles of the present invention can be selected as carrier powder coatings, which carriers contain, for example, a steel core, and can be admixed with toner compositions comprised of resin particles, pigment particles and optional additives such as charge control components, reference U.S. Pat. No. 4,560,635, the disclosure of which is totally incorporated herein by reference, enabling the formation of a developer composition useful in electrophotographic imaging and printing processes.

The following Examples are being submitted to further define various species of the present invention. These Examples are intended to be illustrative only and are not intended to limit the scope of the present invention. Also, parts and percentages are by weight unless otherwise indicated.

EXAMPLE I

In a 1 liter glass reactor 150 grams of REGAL 330®carbon black were added to 500 grams of toluene with 5 grams of 2'-azobis(2,4-dimethylvaleronitrile), 2 grams of benzoyl peroxide, 5 grams of dodecanethiol (chain transfer agent) and 150 grams of methyl methacrylate monomer. The resulting mixture was polymerized at 50° C. for 24 hours. The temperature was then increased to 70° C. for 3 hours to complete the polymerization. The resulting product was vacuum dried. 176 Grams of this solution polymerized blend of PMMA (polymethylmethacrylate) and carbon black (CB) were dispersed in 510 grams of methyl methacrylate monomer for 48 hours, and then 40 grams of 2,2'-azobis(2,4-dimethylvaleronitrile), 16.0 grams of benzoyl peroxide and 3.0 grams of divinylbenzene crosslinking agent were added, and mixed until dispersed. This monomer/polymer/CB phase was then mixed with 2,200 milliliters of water containing four weight percent of polyvinyl alcohol (weight average molecular weight 3,000) and vigorously stirred at 10,000 rpm for 5 minutes to produce a microsuspension of polymeric particles in water. The suspension polymerization temperature was raised to 60° C. for 2 hours, and then to 85° C. for 1 hour. The microsuspension product was washed in 5 liters of methanol. A second wash was accomplished with methanol/water (50:50 ratio) and a third wash with deionized water. After the final wash, the product was freeze dried. Using a scanning electron microscope (SEM), photomicrographs of the dry product showed the average particle size of the polymer product was 0.8 micron with a glass transition temperature of 113° C. as measured by DSC. Evaluation showed the powder product conductivity was $10^{-2}$ (ohm-cm)$^{-1}$, as determined by measuring the electrical resistance of a pressed powder pellet, Transmission Electron Microscopy showed less than 1 percent unpigmented partiicles. 0.7 Gram of the resulting polymethyl methacrylate particles containing carbon black were mixed with 100 grams of Hoeganoes core carrier with an average bead diameter of 90 microns in a Munson type mixer at room temperature. The coated materials were then fused on the surface of the carrier at 350° F. in a rotary kiln furnace. The product was sieved through a 177 micron screen to remove coarse materials. The coarse fraction was found to be about 0.08 weight percent. The sieved materials were scanned for surface coverage using the SEM. The results evidenced 100 percent surface coverage of polymer. A functional evaluation of the resulting carrier in the Xerox Corporation 5100 two component development system indicated it had a triboelectric charge (tribo) of 26 microcoulombs per gram (μc/g) and a conductivity of $10^{-8}$ (ohm-cm)$^{-1}$ as determined by the Faraday Cage method. Thermal gravimetric analysis evidenced that the carbon black content was 12.7 weight percent, indicating all the carbon black remained in the interior of the particles, and that there was no free carbon black.

EXAMPLE II

The process of Example I was repeated except that styrene monomer was used instead of methyl methacrylate. The resulting product has an average particle size of 0.7 micron with a conductivity of $10^{-3}$ (ohm-cm)$^{-1}$ and glass transition temperature of 102° C. The same carrier coating as described in Example I was used resulting in a 0.6 weight percent coarse fraction. The coated carrier had a tribo of 15 microcoulombs per gram and a conductivity of $10^{-8}$ (ohm-cm)$^{-1}$.

EXAMPLE III

The process of Example I was repeated except that 150 grams of CONDUCTEX 975™ carbon black were used. The resulting polymeric product had an average particle size diameter of 0.7 micron and a glass transition temperature of 115° C. The same carrier coating as described in Example I was used resulting in a coarse fraction of 0.5 weight percent. The coated carrier had a tribo charge of 28 microcoulombs per gram and a conductivity of $10^{-8}$ (ohm-cm)$^{-1}$ as determined by the Faraday Cage method.

EXAMPLE IV

The process of Example I was repeated except 50 grams of acetylene black (Chevron Shawinigan Company) were used. The resulting polymeric product had an average particle size of 0.6 micron with glass transition temperature of 111° C. The same carrier coating process as described in Example I was used resulting in a coarse fraction of 0.3 weight percent. The coated carrier had a tribo charge of 31 microcoulombs per gram and a conductivity of $10^{-10}$ (ohm-cm)$^{-1}$.

EXAMPLE V

The process of Example I was repeated except that pentafluorostyrene monomer was used. The resulting product had an average particle size of 0.9 micron and glass transition temperature of 106° C. The same carrier coating as described in Example I was used resulting in a 0.2 weight percent coarse fraction. The coated carrier had a tribo charge of −25 microcoulombs per gram.

COMPARATIVE EXAMPLE 1

An experiment analogous to Example I was conducted using the process disclosed in U.S. Pat. No. 5,236,629. REGAL 330®carbon black (82 grams) was dispersed in 510 grams of methyl methacrylate monomer with 40 grams of 2,2'-azobis(2,4-dimethylvaleronitrile), 16.0 grams of benzoyl peroxide and 3.0 grams of divinylbenzene crosslinking agent. This organic phase was partially bulk polymerized by heating to 45° C. until 12 weight percent of the monomer had been converted to polymer, and then cooled to 10° C. The resulting mixture was then mixed with 2,200 milliliters of water containing four weight percent polyvinyl alcohol (molecular weight $M_w$ 3,000) and vigorously stirred at 10,000 rpm for 5 minutes. The suspension polymerization temperature was raised to 60° C. for 2 hours, and then to 85° C. for 1 hour. The microsuspension product was washed and dried as in Example I. SEM photomicrographs of the dry product showed the average particle size diameter of the polymer product was 0.9 micron. Evaluation showed the powder conductivity was $10^{-3}$ (ohm-cm)$^{-1}$, compared to $10^{-2}$ (ohm-cm)$^{-1}$ for Example I as determined by measuring the electrical resistance of a pressed powder pellet. Transmission electron microscopy showed approximately 3 to 4 percent of unpigmented particles, compared to less than 1 percent for Example I. 0.7 Gram of the resulting polymethyl methacrylate particles containing carbon black were mixed with 100 grams of Hoeganoes core carrier with an average bead diameter of 90 microns in a Munson type mixer at room temperature. The coated materials were then fused on the surface of the carrier at 350° F. in a rotary kiln furnace. The functional evaluation of the resulting carrier in the Xerox Corporation 5100 two component development system indicated a triboelectric charge (tribo) of 28 microcoulombs per gram (μc/gram), compared to 26 μc/gram for Example I, and a conductivity of $10^{-9}$ (ohm-cm)$^{-1}$, as compared to $10^{-8}$(ohm-cm)-1 for Example I. Thermal gravimetric analysis evidenced that the carbon black content was 12.6 weight percent. The modified semisuspension polymerization process of the present invention produced more conductive polymer particles and more conductive carrier than the '629 process.

Conductivity and tribocharge were measured as indicated herein, see Comparative Example 2 for example.

COMPARATIVE EXAMPLE 2

Comparative Example 1 was repeated except that the bulk polymerization was stopped when only 6 weight percent of the monomer had been converted to polymer. SEM photomicrographs of the dry product showed the average particle size of the polymer product was 0.5 micron. Evaluation showed the powder conductivity was $10^{-6}$ (ohm-cm)$^{-1}$, compared to $10^{-2}$ (ohm-cm)$^{-1}$ for Example I as determined by measuring the electrical resistance of a pressed powder pellet. Transmission electron microscopy showed approximately 10 to 15 percent of unpigmented particles, compared to less than 1 percent for Example I. 0.7 Gram of the resulting polymethyl methacrylate particles containing carbon black were mixed with 100 grams of Hoeganoes core carrier with an average bead diameter of 90 microns in a Munson type mixer at room temperature. The coated materials were then fused on the surface of the carrier at 350° F. in a rotary kiln furnace. The functional evaluation of the resulting carrier in the Xerox Corporation 5100 two component development system indicated a triboelectric charge (tribo) of 29 microcoulombs per gram (μc/gram), compared to 26 μc/gram for Example I, and a conductivity of $10^{-13}$ (ohm-cm)$^{-1}$, as compared to $10^{-8}$ (ohm-cm)$^{-1}$ for Example I. Thermal gravimetric analysis evidenced that the carbon black content was 6.9 weight percent compared to 12.7 percent in Example I signifying that during the suspension polymerization step free carbon black diffused out of the polymerizing particles into the aqueous phase. This explanation is further evidenced by the observation that large amounts of free carbon black were observed in the supernatant during the washing of the particles. This Example indicates that the modified semisuspension polymerization process of the present invention is more robust than the '629 process, and that product conductivity can decrease significantly, for example by from about 1 to about 5 orders of magnitude.

Other modifications of the present invention may occur to those skilled in the art subsequent to a review of the present application. The aforementioned modifications, including equivalents thereof, are intended to be included within the scope of the present invention.

What is claimed is:

1. A process for the preparation of conductive polymeric particles with linear and crosslinked portions, which comprises in the following order mixing a comonomer with at least one conductive filler, solvent, at least one polymerization initiator in the amount of about 0.1 to about 20 weight percent of said comonomer, and a chain transfer component in the amount of about 0.01 to about 1 weight percent of said comonomer; effecting solution polymerization by heating until from about 80 to about 100 weight percent of the comonomer has been polymerized; drying the mixture by removing the solvent to yield an intimate blend of polymer with conductive filler; dispersing the aforementioned blend of polymer and conductive filler in at least one additional comonomer with at least one polymerization initiator, a crosslinking agent in the amount of about 0.1 to about 5 weight percent of said additional comonomer and a chain transfer agent to form an organic phase; dispersing the resulting organic phase mixture in water containing a stabilizing component in the amount of about 0.1 to about 5 weight percent of said water to obtain a suspension of particles with an average volume diameter of from about 0.05 to about 5 microns in water; polymerizing the resulting suspension by heating; and subsequently optionally washing and drying the polymeric product to produce conductive polymeric particles wherein the total amount of conductive filler is from about 1 to about 50 weight percent and the total amount of polymer is from about 50 to about 99 weight percent.

2. A process in accordance with claim 1 wherein said comonomer or said additional comonomer is a mixture of monomers.

3. A process in accordance with claim 2 wherein the mixture contains from 2 monomers to about 20 monomers.

4. A process in accordance with claim 1 wherein the polymerized polymer product obtained is subjected to continuous washing and drying.

5. A process for the preparation of conductive polymeric particles with linear and crosslinked portions consisting essentially of mixing a comonomer with at least one conductive filler, solvent, at least one polymerization initiator in the amount of about 0.1 to about 20 weight percent of said comonomer, and a chain transfer component in the amount of about 0.01 to about 1 weight percent of said comonomer; effecting solution polymerization by heating until from about 80 to about 100 weight percent of the comonomer has been polymerized; drying the mixture by removing the solvent to yield an intimate blend of polymer with conductive filler; dispersing the aforementioned blend of polymer and conductive filler in at least one additional comonomer with at least one polymerization initiator, a crosslinking agent in the amount of about 0.1 to 5 weight percent of said additional comonomer and a chain transfer agent to form an organic phase; dispersing the resulting organic phase mixture in water containing a stabilizing component in the amount of about 0.1 to about 5 weight percent of said water to obtain a suspension of particles with an average volume diameter of from about 0.05 to about 5 microns in water; polymerizing the resulting suspension by heating; and subsequently optionally washing and drying the polymeric product to produce conductive polymeric particles wherein the total amount of conductive filler is from about 1 to about 50 weight percent and the total amount of polymer is from about 50 to about 99 weight percent.

6. A process in accordance with claim 1 wherein heating is accomplished at a temperature of from about 30° C. to about 200° C.

7. A process in accordance with claim 1 wherein heating is accomplished at a temperature of from about 45° C. to about 120° C.

8. A process in accordance with claim 1 wherein the number average molecular weight of the solution polymerization product is between about 3,000 to about 500,000, and the weight average molecular weight of the solution polymerization product is between about 5,000 to about 2,000,000.

9. A process in accordance with claim 2 wherein the mixing of the conductive fillers in the mixture of monomers and solvent prior to the solution polymerization is achieved with a high shear mixer.

10. A process in accordance with claim 1 wherein the dispersion of the mixture of conductive filler polymer and comonomer or additional comonomer in water containing the stabilizing component is accomplished with a high shear mixer.

11. A process in accordance with claim 1 wherein the ratio of the crosslinked polymer/linear polymer in the final product is from about 0.001 to about 0.25.

12. A process in accordance with claim 1 wherein the conductive polymeric particles obtained have an average volume particle diameter of from about 0.05 micron to about 5 microns.

13. A process in accordance with claim 2 wherein the weight percentage of conductive filler in the final product is from about 1 to about 50.

14. A process in accordance with claim 1 wherein the conductive filler is evenly distributed throughout the polymer matrix of the final product.

15. A process in accordance with claim 1 wherein the conductivity of the final conductive polymer product is from about $10^{-10}$ to about $10^{-1}$ (ohm-cm)$^{-1}$ as determined by measuring the electrical resistivity of a pressed pellet.

16. A process in accordance with claim 1 wherein the number and weight average molecular weight of the linear portion of the polymer in the product polymer is between about 5,000 to about 500,000.

17. A process in accordance with claim 1 wherein the triboelectrical charge of the polymer product is from about +40 to about –40 microcoulombs per gram.

18. A process in accordance with claim 1 wherein the comonomer or additional comonomer is selected from the group consisting of α-methylstyrene, p-chlorostyrene, monocarboxylic acids and the derivatives thereof; dicarboxylic acids with a double bond and their derivatives; vinyl ketones; vinyl naphthalene; unsaturated mono-olefins; vinylidene halides; N-vinyl compounds; fluorinated vinyl compounds and mixtures thereof.

19. A process in accordance with claim 1 wherein the comonomer or additional comonomer is selected from the group consisting of acrylic acid, methyl acrylate, ethyl acrylate, butyl acrylate, dodecyl acrylate, octyl acrylate, phenyl acrylate, methacrylic acids, methyl methacrylate, ethyl methacrylate, butyl methacrylate, octyl methacrylate, acrylonitrile and acrylamide; maleic acid, monobutyl maleate, dibutyl maleate; vinyl chloride, vinyl acetate, vinyl benzoate; vinylidene chloride; pentafluoro styrene allyl pentafluorobenzene and N-vinyl pyrrole.

20. A process in accordance with claim 1 wherein the filler is selected from the group consisting of conductive carbon blacks, metal oxides, metals, and mixtures thereof.

21. A process in accordance with claim 1 wherein the filler is selected from the group consisting of acetylene black, iron oxides, titanium oxide, $SnO_2$, and iron powder.

22. A process in accordance with claim 1 wherein the polymerization initiator is selected from the group consisting of azo compounds and peroxides.

23. A process in accordance with claim 22 wherein the polymerization initiator is benzoyl peroxide, lauroyl peroxide, 1-1-(t-butylperoxy)-3,3,5-trimethylcyclohexane, n-butyl-4,4-di-(t-butylperoxy)valerate, dicumyl peroxide, 2,2'azodimethylvaleronitrile, 2,2'azoisobutyronitrile, azobiscyclohexanenitrile, or 2-methylbutyronitrile.

24. A process in accordance with claim 1 wherein the stabilizing component is selected from a group consisting of nonionic and ionic water soluble polymeric stabilizers.

25. A process in accordance with claim 1 wherein the stabilizing component is selected from the group consisting of methyl cellulose, ethyl cellulose, hydroxypropyl cellulose, the sodium salt of carboxyl methyl cellulose, polyacrylate acids, polyvinyl alcohol, gelatins, starches, gums, alginates, zein and casein.

26. A process in accordance with claim 1 wherein the stabilizing component is tricalcium phosphate, talc or barium sulfate.

27. A process in accordance with claim 1 wherein the crosslinking component is selected from the group consisting of compounds having two or more polymerizable double bonds.

28. A process in accordance with claim 1 wherein the crosslinking component is divinylbenzene, divinylnaphthalene, ethylene glycol diacrylate, or divinylether.

29. A process in accordance with claim 1 wherein the chain transfer component is selected from the group consisting of mercaptans and halogenated hydrocarbons.

30. A process in accordance with claim 29 wherein the chain transfer component is carbon tetrachloride, butylmercaptan, or laurylmercaptan.

31. A process in accordance with claim 1 wherein from about 0.1 to about 25 of said polymeric particles are comprised of crosslinked portions.

32. A process in accordance with claim 31 wherein from about 1 to about 5 percent by weight of said polymeric particles are comprised of crosslinked portions.

33. A process n accordance with claim 1 wherein said polymerization initiator is benzoyl peroxide.

* * * * *